United States Patent [19]

Norris

[11] Patent Number: 4,549,708

[45] Date of Patent: Oct. 29, 1985

[54] COWLING LATCH SYSTEM

[75] Inventor: James R. Norris, Bolton, Conn.

[73] Assignee: United Technologies Corporation, Hartford, Conn.

[21] Appl. No.: 413,580

[22] Filed: Aug. 31, 1982

[51] Int. Cl.[4] .................. B64D 29/06; B64D 29/08
[52] U.S. Cl. ................................. 244/129.4; 292/28; 294/82.32; 294/116
[58] Field of Search ............... 244/129.4, 53 R, 129.1; 60/226.1, 39.31; 292/113, 28, 50, DIG. 31; 294/111, 116, 86.27, 86.28, 86.3, 82.32; 254/256

[56] References Cited

U.S. PATENT DOCUMENTS

| | | | |
|---|---|---|---|
| 1,504,648 | 8/1924 | Skinner | 294/86.28 |
| 1,542,151 | 6/1925 | Lehtonen | 292/28 |
| 1,796,709 | 3/1931 | Halvorson | 292/113 |
| 2,787,442 | 4/1957 | Lewis | 254/256 |
| 2,800,346 | 7/1957 | Manning | 244/129.4 |
| 2,816,732 | 12/1957 | Gonzales et al. | 254/256 |
| 3,347,578 | 10/1967 | Sheehan et al. | 292/113 |
| 3,384,402 | 5/1968 | Swanson | 292/113 |
| 3,541,794 | 11/1970 | Johnston et al. | 60/39.31 |
| 3,834,747 | 9/1974 | Slovensky, Jr. | 292/DIG. 31 |
| 4,017,112 | 4/1977 | Delest | 294/116 |
| 4,220,364 | 9/1980 | Poe | 292/113 |
| 4,365,775 | 12/1982 | Glancy | 244/129.4 |

FOREIGN PATENT DOCUMENTS

| | | | |
|---|---|---|---|
| 383578 | 11/1921 | Fed. Rep. of Germany | 294/111 |
| 2805027 | 8/1978 | Fed. Rep. of Germany | 244/53 R |

Primary Examiner—Galen L. Barefoot
Attorney, Agent, or Firm—Gene D. Fleischhauer

[57] ABSTRACT

A latch system 34 for the nacelle cowling 24 of a gas turbine engine 10 is disclosed. The latch system includes a coupling 36 which may be remotely operated by means of a cable 44. In one embodiment, a support structure 14, the coupling, the cable and a linkage system 48 for applying tension to the cable extends circumferentially about the interior of the cowling to provide constricting force on the cowling to increase the structural rigidity of the cowling. In another embodiment, the coupling has jaws 58 and 60 which are movable from a locked to an unlocked position as a result of the relative movement between the jaws and a housing 50. A linkage system is provided for tensioning the cable which in the locked position uses the tension in the cable to resist operative forces which might seek to open the latching system.

12 Claims, 8 Drawing Figures

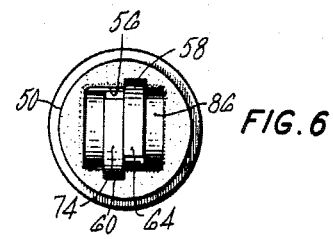
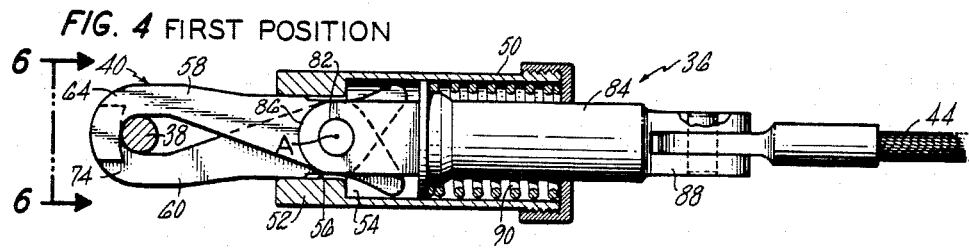
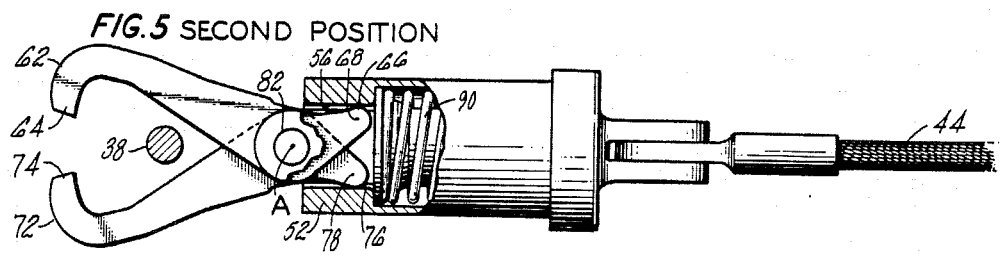
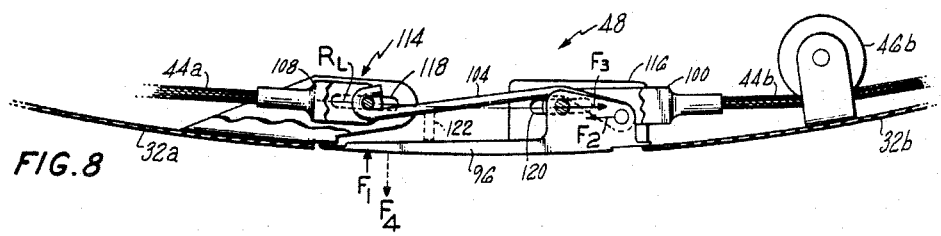
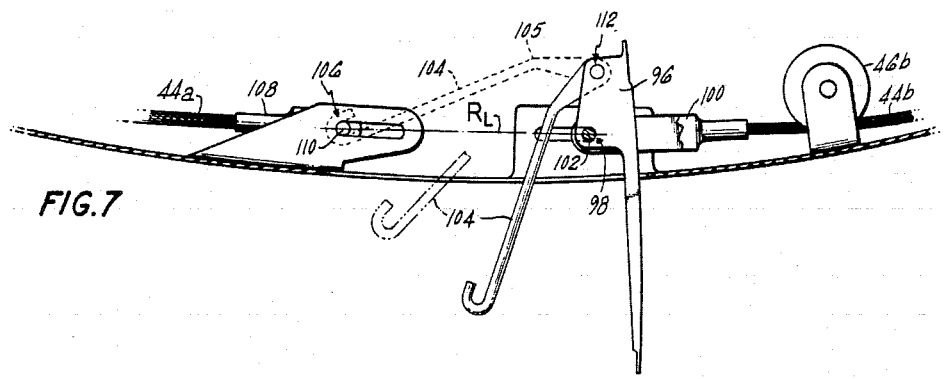

1

COWLING LATCH SYSTEM

DESCRIPTION

1. Technical Field

This invention relates to nacelle structures for gas turbine engines and, more particularly, to a cowling latch system for such a nacelle. The concepts of the present invention were developed during work on nacelles for aircraft gas turbine engines. These concepts have applicability to fields other than the field of gas turbine engines.

2. Background Art

Gas turbine engines are mounted on an aircraft by pylons or a similar support structure. A nacelle which circumscribes the engine is provided in such installations to form an enclosed shelter for the engine. The nacelle is generally supported in part from the engine and in part from the pylon. The nacelle is aerodynamically contoured to reduce aerodynamic drag on the nacelle during operation of the aircraft.

The nacelle has a removable metal covering known as a cowling. The cowling includes a fan duct reverser cowl and a core cowl. The cowlings are hinged or removable to provide access to the engine and to the inside of the nacelle enabling personnel to inspect and service the engine and related components. In the past, nacelles had two separate cowlings, a reverser cowling and a core cowling. These cowlings were axially adjacent to each other. Each cowling had a pair of clamshell doors. Each door of the pair of doors was separately hinged from a support structure about a hinge line. Because of the aerodynamic contouring of the nacelle, these hinge lines were radially spaced apart.

In modern jet engines, the normally separate doors have been attached together to form a nacelle which is structurally stiffer than nacelles having two sets of doors. The additional stiffness of the nacelle resists aerodynamic bending loads on the nacelle and reinforces the engine against its own bending loads which occur during operation. Because a single door cannot have two radially spaced hinge lines and because of the need for aerodynamic contouring of the nacelle, hinges are only installed along the forward portion of the door. The aft portion of the door corresponding to the core cowling of earlier nacelles is allowed to abuttingly engage the support structure along the upper edge of the door. The doors are normally attached together at the bottom of the nacelle by latches. The doors are also attached at the top of the nacelle to further increase the structural stiffness of the nacelle by providing a continuous load path about the nacelle through the doors to the support structure.

One way of attaching the doors at the top of the nacelle is to provide a separately operated latch which extends between the top of the doors and the support structure. A top mounted latch is difficult to reach by people on the ground because of the size of the present day aircraft engines, the resultant size of the nacelle, and the size of the aircraft to which the nacelle is attached. In some cases, the latch has not been secured in a proper manner.

Accordingly, scientists and engineers are seeking to design a latch system for nacelles which provides automatic latching at the top of the nacelle from a remote location at the bottom of the nacelle for safety and for increased load sharing by the nacelle and yet which releases at the top of the nacelle when the doors to the nacelle are opened to permit rotation of the doors about a hinge.

DISCLOSURE OF INVENTION

According to the present invention, a latching system for the cowling of a nacelle includes a coupling which is remotely operable between a locked position and an unlocked position by tension in a cable.

In accordance with one embodiment of the present invention, a latching system for a nacelle of a gas turbine engine attached to a support structure includes a first length of cable attached to the support structure, a second length of cable which is adapted to engage the opposite side of the support structure by a remotely operated coupling, and a means for applying tension to the free ends of the two cables remotely operate the coupling and to apply a constricting force to the cowling to increase the structural rigidity of the cowling.

In accordance with one detailed embodiment of the invention, the remotely operated coupling includes a pair of jaws which are pivotably attached one to the other and a housing which is movable with respect to the jaws to engage the jaws on one side of the point of pivotable attachment to open the jaws and on the other side on the point of pivotable attachment to close the jaws.

A primary feature of the present invention is a latch system for a nacelle which employs a cable and a remotely operated coupling. Another feature is a linkage system for applying tension to the cable. In one embodiment, the coupling has a jaw having a hook and an ear. The coupling has a housing and a shaft. The jaw is pivotably attached to the shaft and movable with respect to the housing. In one detailed embodiment, the linkage system engages two cables and includes a first bar and a second bar each attached to one of the cables. The second bar is bent toward a reference line $R_1$ passing through the point of attachment of the cables to the bars.

A principal advantage of the present invention is the unlocking and locking of the coupling which occurs automatically in response to the level of tension in the circumferentially extending cable. Still another advantage is a linkage system which increases the latching force in response to a force urging the latch to the open position which results from the configuration of the bars and the orientation of the bars of the latch to each other.

In one embodiment, an advantage is the structural rigidity of a cowling having hinged doors which results from the circumferential rigidity provided by a continuous load path extending about the nacelle.

The foregoing features and advantages of the present invention will become more apparent in the light of the following detailed description of the best mode for carrying out the invention and in the accompanying drawing.

BRIEF DESCRIPTION OF DRAWINGS

FIG. 4 is an side elevation view of a coupling for the latching system shown in FIG. 2.

FIG. 5 is a view corresponding to the view in FIG. 4 and shows the coupling in a moved position.

FIG. 6 is a view of the coupling taken along the lines 6—6 of FIG. 4.

FIG. 7 is a side elevation view of a linkage system for the latching system shown in FIG. 2 with portions of the linkage system broken away.

FIG. 8 is a view corresponding to the view in FIG. 7 and shows the linkage system in a moved position.

BEST MODE FOR CARRYING OUT INVENTION

Figure 1:
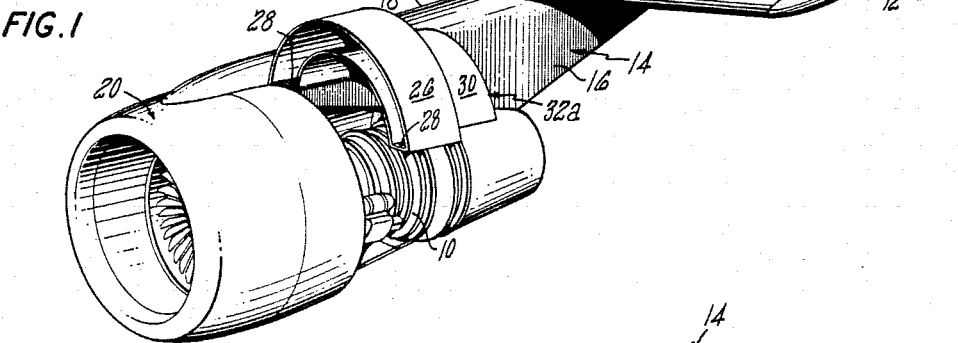
FIG. 1 is a perspective view of a portion of an aircraft wing showing an aircraft engine and a nacelle for the engine mounted to the wing by a pylon.

A turbine engine 10 of the axial flow, turbo-fan type is shown in FIG. 1. A support structure such as the wing 12 of an aircraft extends above the engine. The wing includes a pylon 14 which engages the engine. The pylon has a first side 16 and a second side 18. A nacelle 20 is attached to the sides of the pylon. The nacelle circumscribes the engine and assists the pylon in both supporting and positioning the engine from the aircraft wing.

Figure 2:
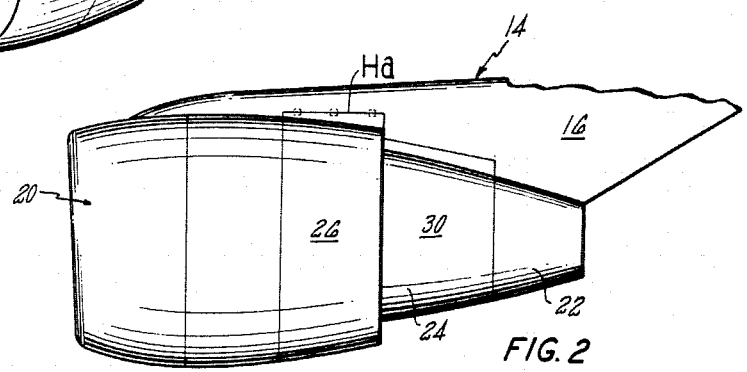
FIG. 2 is a side elevation view of the nacelle and pylon shown in FIG. 1.
Figure 3:
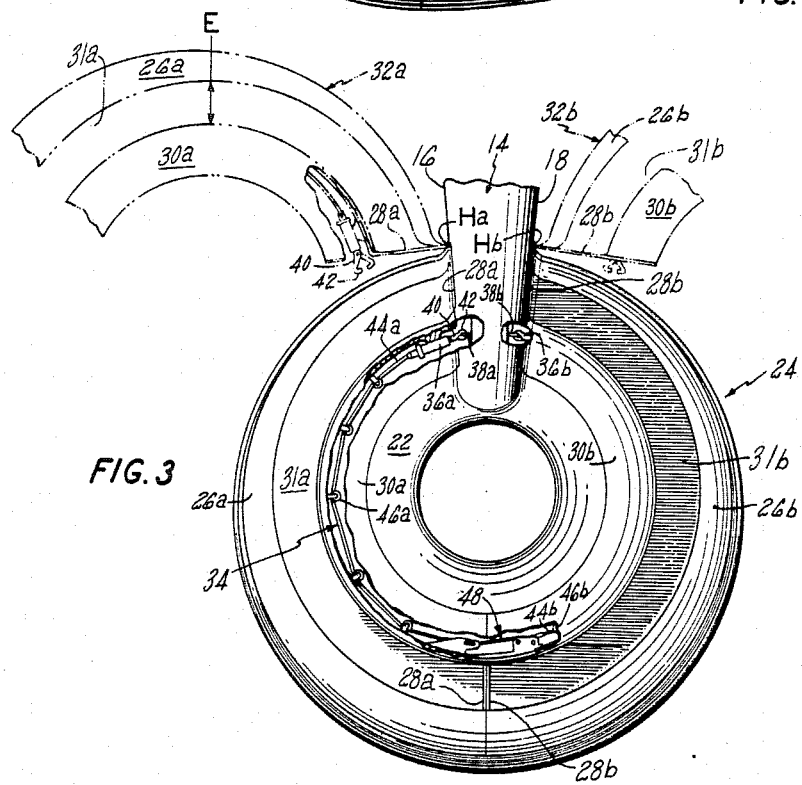
FIG. 3 is an end view of the nacelle and pylon of FIG. 2 broken away to show a latching system and showing in phantom the moved position of the nacelle doors.

As shown in FIGS. 1-3, the nacelle 20 has an afterbody 22 and a hinged cowling 24. The hinged cowling includes a reverser cowling 26, endwalls 28, and a core cowling 30 which forms the fan air discharge passage 31a and 31b. The hinged cowling is split along the bottom of the nacelle into a pair of clamshell doors 32a and 32b. The doors open to provide access to the engine. The clamshell door 32a is hinged to the first side of the pylon at the reverser cowling along a hinge line Ha. The clamshell door 32b is hinged to the second side of the pylon at the reverser cowling along a hinge line Hb. One or more clamps (not shown) extend across the bottom of the doors between the two halves of the reverser cowling.

The core cowling 30 is spaced inwardly from the reverser cowling by a distance which is greater than the height E of the endwall 28. Accordingly, the core cowling abbutingly engages the sides 16 and 18 of the pylon at a location which is radially spaced from the hinge lines Ha and Hb. A latch system 34 for attaching the core cowling to the pylon 14, or to an equivalent support structure 14 such as a portion of the gas turbine engine in proximity to the pylon, extends between the pylon and such a support structure. The latch system includes a first coupling 36a and a second coupling 36b for attaching the doors to the pylon. The first coupling extends between the first clamshell door 32a and the pylon. The second coupling extends between the second clamshell door 32b and the pylon. Each side of the pylon has a clevis 38 which adapts the pylon to engage the associated coupling. Each coupling has an elongated member 40 having a hook 42, which adapts the member to engage the clevis. A first cable 44a engages the first coupling. A second cable 44b engages the second coupling. A plurality of pulleys 46a and 46b are attached to the interior of the first door and second door. The cables extend circumferentially about the interior of the cowling and slidably engage the pulleys. As used herein the word "cable" includes cables, chains, and other flexible means capable of transmitting a tensile force and the fittings needed to attach the ends of such flexible devices to adjacent members.

A means for applying tension to the cables, such as the linkage system 48, is spaced from the couplings 36a and 36b. The linkage system engages the first cable and the second cable. The linkage system in the locked position extends between the first and second clamshell doors 32a, 32b. The linkage system, the cable 44, the couplings 36a, 36b in the locked position, and the pylon 14, provide a continuous hoop extending about the interior of the core cowling 30 for resisting loads acting on the nacelle.

FIG. 4 and FIG. 5 are cross-sectional views of the coupling 36 in two different positions. FIG. 4 shows the coupling in a first position moving toward the locked position. FIG. 5 shows the coupling in a second position moving toward the unlocked position.

The coupling 36 includes a housing 50 having a wall 52. The wall extends circumferentially about a passage 54. The wall converges to form an opening 56 which is smaller than the passageway. The coupling has two elongated members 40, such as the first jaw 58 and the second jaw 60. The jaws extend through the opening in the housing and into the passageway. The first jaw has a first end 62 having a hook 64 and a second end 66 having an ear 68. The second jaw has a first end 72 having a hook 74 and a second end 76 having an ear 78. The ear of the first jaw extends away from the ear of the second jaw and the ear of the second jaw extends away from the ear of the first jaw. The hook 64 of the first jaw 58 extends toward the hook 74 of the second jaw 60 and is adapted to overlap the hook on the second jaw.

A pin 82 extending between the jaws pivotably attaches the first jaw 58 to the second jaw 60 about the axis A at a location which is between the ear and the hook of each jaw. A shaft 84 is slidable in the passageway 54 with respect to the housing 50. The shaft has a first end 86 and a second end 88. The first end engages the pin. The second end engages the cable 44. A spring 90 is trapped between the second end of the shaft and the housing. The spring exerts a force on the shaft in a direction which opposes the force exerted by the cable.

As the tension in the cable is increased, the force exerted by the cable 44 overcomes the force of the spring. As shown in FIG. 4, the first jaw 58 and the second jaw 70 move with respect to the housing 50 toward the locked position to a first position. The wall 52 of the housing engages each jaw at a position lying between the pin 82 and the hooks 64 and 74. The wall exerts a rotational force on each jaw which urges the jaws together toward the locked position. Thus, the housing exerts a counterclockwise force on the first jaw and a clockwise force on the second jaw.

As the tension in the cable is decreased, the force exerted by the cable 44 is overcome by the force of the spring. As shown in FIG. 5, the first jaw 58 and the second jaw 70 move with respect to the housing toward the unlocked position to a second position. The wall 52 of the housing engages the ear of each jaw between the pin and the end of the jaw to exert a rotational force on the jaw which urges the jaw toward the unlocked position. Thus, the housing exerts a force which acts in a clockwise direction on the first jaw and in the counterclockwise direction on the second jaw. As used herein, phrases such as "the jaws are movable with respect to the housing" denote relative movement and include any equivalent relative movement between the jaws and the housing such as the jaws moving and the housing remaining stationary, or the housing moving and the jaws remaining stationary or both the jaws and the housing moving. For purposes of illustration, the housing is shown in FIG. 3 as being fixedly attached to the cowling by welding, bolting or any other suitable means of attachment. Alternate constructions might employ a movable housing and a shaft 84 which is attached to the cowling. In such equivalent constructions, the housing is moved, for example, by the cable in a direction which causes the jaws to pivot about the pin 82. As will be realized, the coupling will not have the ability to tighten after closing.

A satisfactory coupling may also be formed by using a single elongated member 40, such as the first jaw 58, and pivotably attaching the member 58 about the axis A of the pin 82 to the shaft 84. The hook 42 might be extended to have a semi-circular profile. The spacing between the ear and the hook allows the jaws to move a distance in the passageway before the jaws rotate about the pin. This movement allows a jaw having a semi-circular profile to clear the clevis pin 38 before rotating outwardly, permitting the jaw to open.

FIG. 7 and FIG. 8 are views of the linkage system 48 shown in the broken away portion of FIG. 3. The linkage system has a first bar 96. The first bar pivotably engages the second cable 44b to form a first joint 98. The second cable is adapted to engage the first bar by a fitting such as a clevis 100 having a pin 102. A second bar 104 pivotably engages the first cable 44a to form a second joint 106. The first cable is adapted to engage the second bar by a fitting such as clevis 108 having a pin 110. The second bar also pivotably engages the first bar to form a third joint 112. A pair of brackets at each clevis pin, such as the brackets 114 and the brackets 116, are attached to the clamshell doors. The brackets of each pair of brackets are spaced apart by a distance less than the length of the pin. Each bracket is adapted by a slot, such as the slots 118 and 120 to receive an associated clevis pin. The brackets guide the pins as tension is applied to the cables 44a and 44b by the linkage system. Each clevis pin acts as a means for limiting rotational movement of the second bar with respect to the first bar. Rotational movement of the bars is also limited by the clamshell doors. Alternatively, a stop 122 as shown in phantom might extend from the second bar to the first bar to limit rotational movement of the bars.

As shown in FIGS. 1 and 3, opening the latch system 34 allows the clamshell doors to be lifted about the hinge lines Ha and Hb to provide access to the inside of the nacelle 20. The first step in opening the latch system is to rotate the first bar 96 of the linkage system from the position shown in FIG. 8 to the position shown in FIG. 7. As the first bar rotates, the third joint 112 rotates about the first joint 98 to a position closer to the second joint 106 decreasing the tension in the cables 44a and 44b. As tension is decreased, the couplings 36a and 36b move from the first position shown in FIG. 4 to the second position shown in FIG. 5. Finally, the pin 110 of the clevis 108 is disengaged from the second bar 104 permitting the bar 104 to swing freely about the third joint 112 to the position shown in FIG. 7.

The nacelle is closed by lowering the clamshell doors 32a and 32b about the hinge lines Ha and Hb to the latching position as shown in FIG. 3. With the clamshell doors in nearly abutting contact at the bottom of the nacelle, the linkage system is moved to the pre-latched position shown in phantom in FIG. 7 by moving the bar 104 upwardly to engage the pin 110 of the cable 44a. In this position, the third joint 112 is above a reference line RL extending between the first joint and the second joint. The second bar is bent toward the reference line RL by a bend 105. As the first bar 96 is pivoted in the clockwise direction about the pin 102 of the second cable 44b, the third joint 112 is translated with respect to the first two joints. Because of the bend 105 in the second bar the third joint moves from a first position on one side of the reference line RL to a second position on the other side of the reference line. As the bar is rotated with a closing force F into the closed position, the second bar pulls on the first cable and resists movement of the first bar causing a force $F_2$ to act on the first bar. The second cable is pulled towards the first cable, increasing the tension in both cables and causing a force $F_3$ to act on the first bar. The first bar snaps into the closed position shown in FIG. 8. The force $F_2$ exerted by the first cable and the force exerted by the second cable $F_3$ act as a clockwise couple on the first bar which tends to hold the system in the locked position by resisting counterclockwise forces $F_4$ tending to open the linkage system.

As the level of tension in the cables 44a and 44b is raised by reason of the latching action of the linkage system 48, the cables exert a greater and greater force on the spring 90 of each coupling 36 until the spring is compressed, moving the jaws 58 and 60 to the first position shown in FIG. 4. The spacing between the hook and the ears prevents the walls of the housing from immediately engaging the jaws. The jaws translate for a short distance with respect to the clevis 38 on the support without closing. As the jaws are moved into the second position the walls of the housing apply a rotational force to the jaws causing the jaws to close, and as the jaws translate further, to engage the clevis 38 on the support structure 14. The couplings positively attach the core cowling 30 to the support 14 providing a hoop strength capability continuously about the nacelle and particularly along the upper edge of the core cowling. In addition, the cables with the couplings and the linkage system apply a constricting force on the interior of the nacelle increasing the structural rigidity of the nacelle and the ability to the nacelle to aid the engine in resisting bending moments. As will be realized, an alternative system might utilize conventional latches along the bottom of the nacelle to reinforce or to replace the linkage system as the means for closing the nacelle doors.

In summary, the cowling latch system 36 provides tension to two cables which in turn exert a constricting force on a nacelle. The tension automatically causes remote couplings to join the cowling to the support structure 14 for additional load sharing to reduce engine deflection. In addition, the tension causes forces in the latch system which resists the inadvertent opening of the linkage system once the linkage system is placed in the closed position.

Although the invention has been shown and described with respect to detailed embodiments thereof, it should be understood by those skilled in the art that various changes in form and detail thereof may be made without departing from the spirit and the scope of the claimed invention.

I claim:

1. A latch system for the nacelle of a gas turbine engine having a cowling which includes at least one door attached by a hinge joint along a portion of the door to a support structure for the engine, which comprises:

a cable for exerting a force in a first direction as a result of tension in the cable;

a coupling which is attached to the cable and which extends between the cowling and the support structure for attaching the cowling to the support structure, the coupling having a first member and having a second member which is attached to the cable and which is translatable in the first direction in response to a force exerted by said cable, the coupling being movable in response to a first level of tension in said cable to a locked position which attaches the cowling to the support structure and being movable in response to a second level of tension in said cable to an unlocked position which does not attach the coupling to the support structure; and a means spaced from the coupling for applying tension to the cable.

2. A latch system for the nacelle of a gas turbine engine having a cowling which extends circumferentially about the nacelle from a first side of a support structure for the engine to a second side of the support structure, the cowling further including at least one door attached by a hinge joint along a portion of the door to the support structure for the engine, which comprises:

a first cable;

a coupling which is attached to the first cable and which extends between the cowling and the first side of the support structure for attaching the cowling to the support structure, the coupling being movable in response to a first level of tension in the cable to a locked position which attaches the cowling to the support structure and being movable in response to a second level of tension in the cable to an unlocked position which does not attach the coupling to the support structure; and a means spaced from the coupling for applying tension to the cable;

wherein the latch system further includes a second cable which is attached to the second side of the support structure and attached to the means applying tension to the cable, and wherein the first and second cables each extend about the interior of the cowling and slidably engage the cowling at circumferentially spaced intervals such that applying a tension to the cables causes the coupling to join the cowling to the support structure enabling the cables to exert a constricting force on the interior of the cowling.

3. The latch system as claimed in claim 2 for a cowling; wherein the cowling has a first clamshell door and a second clamshell door, each attached by a hinge joint along a portion of the door to the support structure; wherein said coupling is a first coupling, the first coupling in the locked position attaching the first cable to the support structure and attaching the first door to the support structure; wherein the latch system further includes a second coupling of the same construction as the first coupling, the second coupling in the locked position attaching the second cable to the second side of the support structure and attaching the second door to the support structure; and wherein the means for applying tension extends between the first door and the second door.

4. The invention as claimed in claim 2 or 3 wherein the coupling extending between the cowling and the support structure includes a shaft;

an elongated member which has two ends and which is pivotably attached to the shaft about an axis A; and, a housing extending about the elongated member;

wherein the elongated member is movable with respect to the housing to a first position such that the housing engages the elongated member between one end of the member and the axis A to exert a rotational force on the member which urges the member toward the locked position and wherein the housing is movable with respect to the elongated member to a second position such that the housing engages the elongated member between the other end of the member and the axis A to exert a rotational force on the member which urges the member toward the unlocked position.

5. The latch system of claim 4 wherein the elongated member is a first jaw and wherein the coupling further has a second jaw which is pivotably attached to the first jaw.

6. The latch system of claim 5 wherein the coupling includes a pin extending between said jaws to pivotably attach the first jaw to the second jaw and the jaws to the shaft.

7. The latch system of claim 6 wherein said housing is attached to said cowling, said shaft engages said cable, and said coupling further has a spring which is trapped between the shaft and the housing to exert a force which opposes a force exerted by the cable such that a force above a certain level exerted by the cable on the shaft causes the cable to move the jaws to the first position and a force below a certain level exerted by the cable on shaft causes the spring to overcome the force exerted by the cable and to move the jaws to the second position.

8. The latch system of claim 7 wherein the means for applying tension is a linkage system having a first bar which pivotably engages the first cable to form a first joint;

a second bar which pivotably engages the first cable to form a second joint and which pivotably engages the first bar to form a third joint;

and, means for limiting rotational movement of one of said bars around the joint between said bar and the cable;

wherein the second bar is bent toward a reference line R extending between the first and second joints such that the position of the third joint joining the two bars is translatable about the first two joints from a first position on one side of the reference line to a second position on the other side of the reference line to cause a tensile force in each cable which resists movement of the bars from the second position to the first position.

9. A coupling for engaging a support, the coupling being movable between a locked and unlocked position which comprises:

a pair of jaws which are rotatably attached to each other, each jaw being pivotable about an axis A, and a housing extending about the jaws which is movable with respect to the jaws to a first position such that the housing engages each jaw between one end of the jaw and the axis A to exert a rotational force on the jaws which urges the jaws together toward the locked position and movable with respect to the jaws to a second position such that the housing engages each jaw between the other end of the jaw and the axis A to exert a rotational force on the jaws which urges the jaws apart toward the unlocked position.

a means for moving the jaws with respect to the housing which includes a pin extending between the jaws to pivotably attach one jaw to the other and a shaft which is attached to the pin and which is adapted to engage a cable having varying levels of tension therein and wherein a spring is trapped between the shaft and the housing to exert a force which opposes a force exerted by the cable such that a force above a certain level exerted by the cable on the shaft causes the cable to move the jaws to the first position and a force below a certain level exerted by the cable on the shaft causes the spring to overcome the force exerted by the cable and to move the jaws to the second position.

10. A coupling for attaching a tensioned cable to a support which is movable between locked and unlocked positions, the coupling comprising:

a housing having a wall which extends circumferentially about a passage through the housing and which converges to form an opening which is smaller than the passageway;

a first jaw and a second jaw which extend through the opening in the housing and into the passageway, each jaw having a first end having a hook which extends toward the hook of the other jaw and which is adapted to overlap the hook of the other jaw, and a second end having an ear which extends away from the ear of the other jaw;

a pin extending between the jaws to pivotably attach the first jaw to the second jaw at a location which is between the ear and the hook of each jaw;

a shaft in the passageway which is slidable with respect to the housing, the shaft having a first end which engages the pin, a second end which is adapted to engage the cable; and, a spring trapped between the shaft and the housing for exerting a force on the shaft in a direction which opposes the force exerted by the cable;

wherein relative movement between the housing and the jaw causes the jaws to move to a first position with respect to the housing such that the wall of the housing engages each jaw between the pin and the hook to exert a rotational force on each jaw which urges the jaws together toward the locked position and wherein relative movement between the housing and the jaws causes the jaws to move to a second position with respect to the housing such that the wall of the housing engages each the ear of each jaw to exert a rotational force which urges the jaws toward the unlocked position.

11. A linkage system for providing tension to a first cable and a second cable which comprises:

a support, a first bar having a first joint which adapts the bar to pivotably engage the first cable, a second bar having a second joint which adapts the bar to pivotably engage the second cable and which is pivotally attached to the first bar at a third joint, and, means for limiting pivotable movement of one of said bars about the third joint between the bar and the cable;

wherein the second bar is bent toward a reference line R extending between the first and second joints such that the position of the third joint joining the two bars is translatable about the first two joints from a first position on one side of the reference line to a second position on the other side of the reference line to cause a tensile force in each cable which resists movement of the bars from the second position to the first position; and, wherein each bar is adapted to engage a pin on the associated cable, wherein a pair of brackets at each pin are attached to the support and are spaced apart by a distance less than the length of the pin, and wherein each of the brackets are adapted by a slot to slidably receive the associated pin.

12. The linkage system of claim 11 where the means for limiting rotational movement of the second bar is the pin which engages the first bar.

* * * * *